Figure 1:
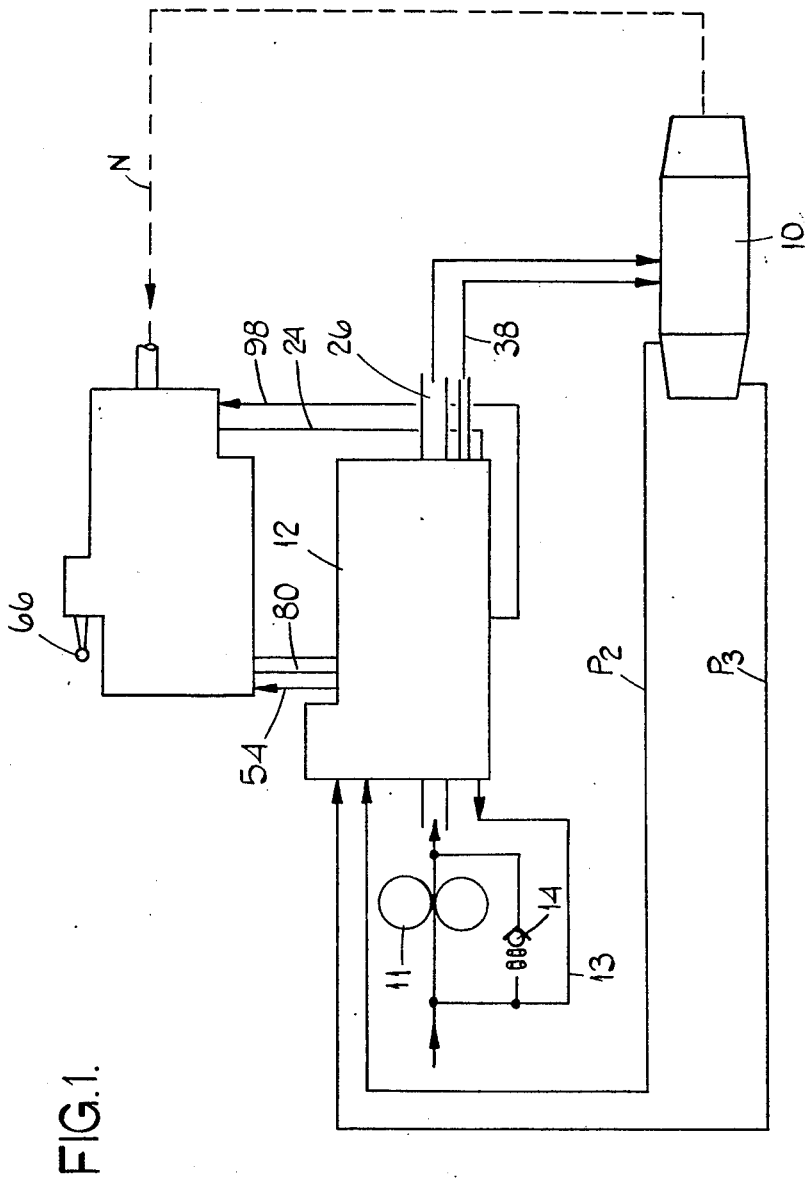

United States Patent [19]

Smith

[11] 4,175,383
[45] Nov. 27, 1979

[54] GAS TURBINE ENGINE FUEL CONTROL SYSTEM

[75] Inventor: Trevor S. Smith, Sutton Coldfield, England

[73] Assignee: Lucas Industries Limited, Birmingham, England

[21] Appl. No.: 852,313

[22] Filed: Nov. 17, 1977

[30] Foreign Application Priority Data

Jan. 7, 1977 [GB] United Kingdom .................. 655/77

[51] Int. Cl.² ............................................. F02C 9/04
[52] U.S. Cl. ............................................. 60/39.28 R
[58] Field of Search ................................. 60/39.28 R

[56] References Cited

U.S. PATENT DOCUMENTS

| | | | |
|---|---|---|---|
| 4,019,317 | 4/1977 | Smith | 60/39.28 R |
| 4,040,599 | 8/1977 | Smith | 60/39.28 R |

*Primary Examiner*—Robert E. Garrett

[57] ABSTRACT

A fuel control system has a main metering device and a flow limiting throttle valve arranged in series, and a spill valve responsive to a pressure drop within the system, for maintaining this pressure drop constant, the arrangement being that when the throttle valve is fully open the spill valve is responsive to the pressure drop across the metering device only, and in all other conditions of the throttle valve the spill valve is responsive to the total pressure drop across the series arrangement of the metering device and throttle valve.

7 Claims, 3 Drawing Figures

GAS TURBINE ENGINE FUEL CONTROL SYSTEM

This invention relates to a fuel control system for a gas turbine engine.

It is known, from British Pat. No. 1465480 to provide a gas turbine engine fuel control system which has a flow limiting valve arranged in series with a variable metering orifice. The flow limiting valve is responsive to unacceptable increases in engine operating condition's, as for example combustion temperature and speed, to reduce fuel flow to the engine, the normal operating condition of the limiting valve being fully open. It is also known from the same patent to provide a spill valve which is responsive to the pressure drop across the variable metering orifice, to maintain this pressure drop constant for a given engine speed, so that fuel flow to the engine is always a known function of the flow area of the metering orifice.

It is a disadvantage of the foregoing arrangement that if the flow limiting valve moves in a closing direction to reduce fuel flow, the pressure drop across the metering valve is also reduced, and the spill valve operates to reduce spill flow, and raises the fuel pressure at the metering orifice inlet, in an attempt to maintain fuel flow to the engine.

U.S. Pat. No. 3,991,569 also discloses a series arrangement of variable metering orifice and flow limiting valve. In this latter arrangement a spill valve is responsive to the total pressure drop across the series arrangement. The disadvantages of the foregoing system are thereby avoided. In the system shown in U.S. Pat. No. 3,991,569 it is, however, a disadvantage that the effective flow area of the limiting valve must be very large, in order that when it is fully open it shall not add significantly to the pressure drop across the metering orifice, and thereby prevent fuel flow to the engine from being a known function of the metering orifice flow area.

It is an object of the present invention to provide a gas turbine engine fuel control system in which both of the foregoing disadvantages are overcome, and which includes a limiting valve which has a relatively small orifice, but in which the system pressure drop is controlled so as to be appropriate whether the limiting valve is operated or not.

According to the invention a fuel control system for a gas turbine engine comprises a variable metering device, a throttle valve in series with said metering device, means for varying the fuel pressure at the inlet of said metering device, and selector means, responsive to operation of said throttle valve, for causing said pressure varying means to be responsive to the pressure difference across said metering device when the throttle valve is fully open, and to the pressure difference across the series arrangement of said metering device and said throttle valve in all other states of said throttle valve.

Figure 2:
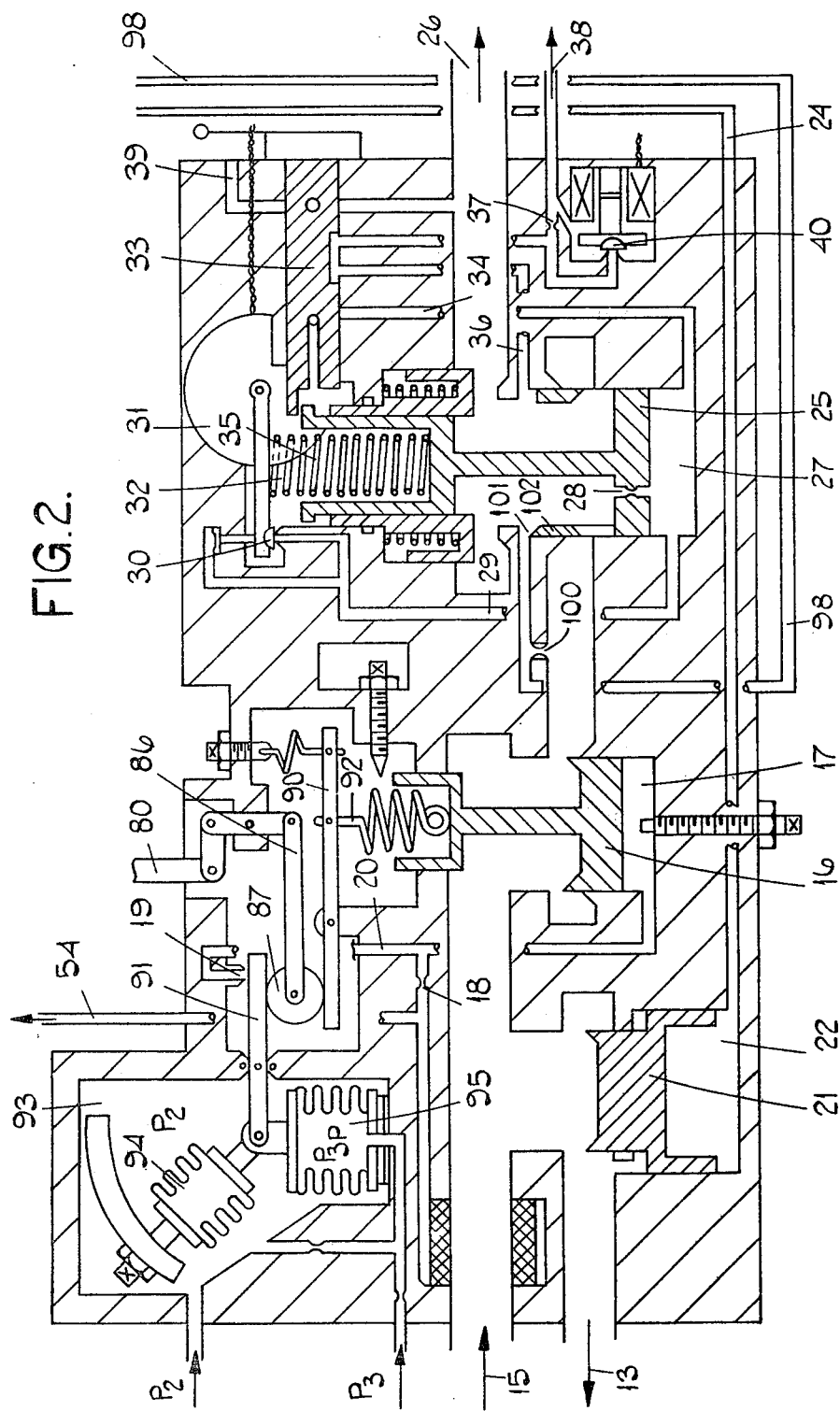
Figure 3:
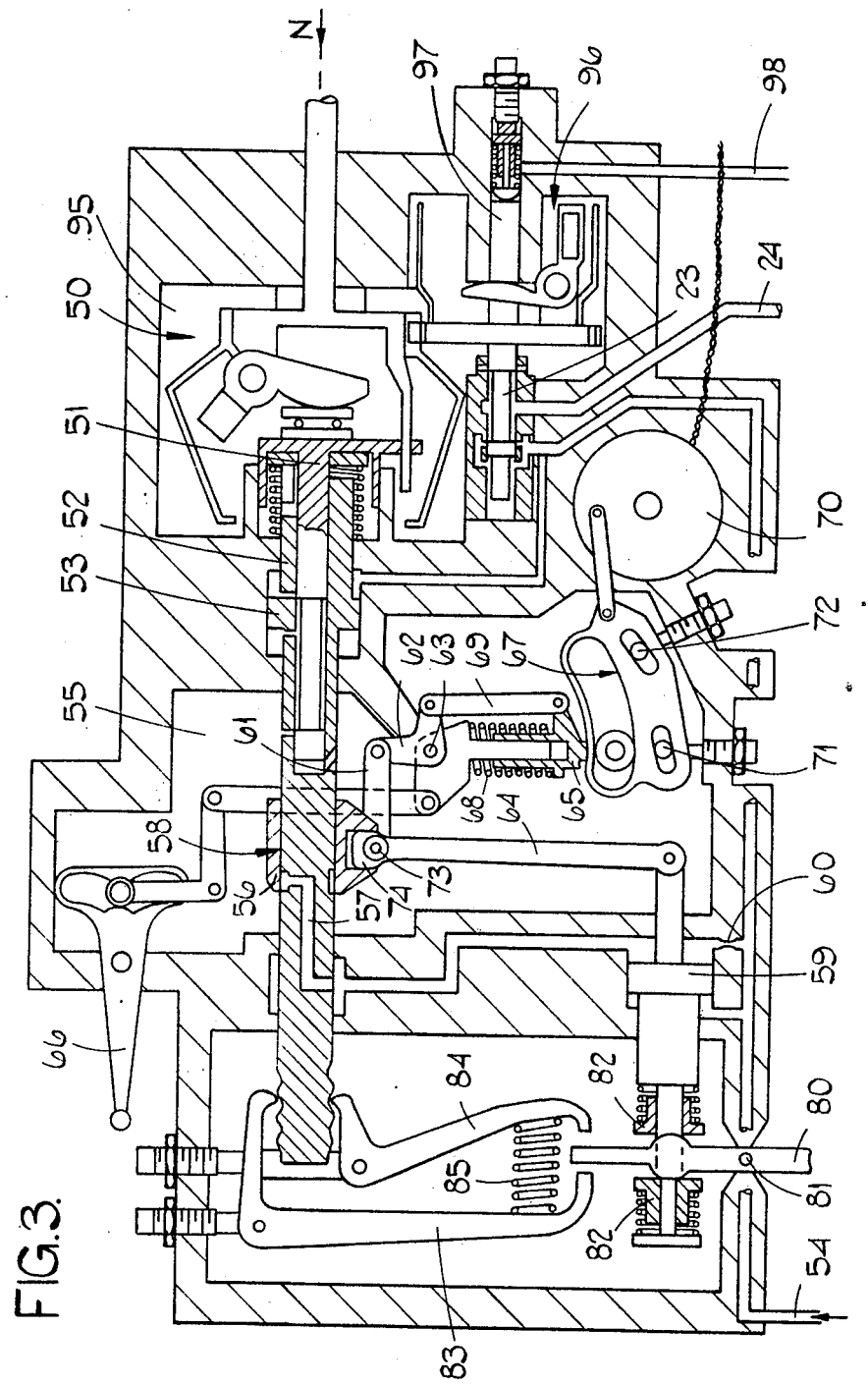

An embodiment of the invention will now be described by way of example only and with reference to the accompanying drawings in which:

FIG. 1 is a block diagram of a fuel control system according to the invention, and FIGS. 2 and 3 show diagrammatically details of respective blocks of FIG. 1.

A gas turbine engine 10 is supplied with fuel from a pump 11 via a metering and throttle valve arrangement 12 which is shown in more detail in FIG. 2. The outlet of the pump 11 communicates with a low pressure return line 13 by way of a non-return valve 14. Fuel from the pump 11 is supplied via a passage 15 to a metering valve 16. Valve 16 is responsive to a first servo pressure in a chamber 17. Chamber 17 communicates with the passage 13 by means of a restrictor 18 and also with a first pilot valve 19, later to be described, by means of a passage 20.

A spill valve 21 allows fuel to be split from the passage 15 to the return line 13. The spill valve 21 is urged open by the pressure in passage 15 and is urged shut by a servo pressure in a chamber 22. A valve 23, later to be described, supplies this servo pressure by means of a line 24.

A throttle valve 25 is arranged in series between the metering valve 16 and an outlet passage 26 through which fuel can flow to the main burners of the engine 10. The throttle valve 25 includes a piston portion which is responsive to the pressure in a chamber 27, this pressure being derived from that in the outlet passage 26 by means of a restrictor 28, a line 29 and a control valve 30. Valve 30 is operated by a torque motor 31 which is responsive to the values of engine speed and combustion chamber temperature, an unacceptable rise in these values causing valve 30 to be opened so that the throttle valve 25 moves downwardly, as shown in FIG. 2, to restrict fuel flow to the outlet passage 26. Valve 30 opens into a chamber 32 which communicates with the low pressure return line 13. A manually-operable valve 33 permits chamber 27 to communicate, via a line 34, with the chamber 32, and thereby to move the throttle valve 25 so as completely to shut off fuel flow to the outlet passage 26. A feed-back spring 35 co-acts with the throttle valve 25 and the control valve 30, so that movement of the valve 25 causes a change in the servo pressure in chamber 27 which opposes that movement.

In the normal operating condition (shown) of the manually operable valve 33 the outlet passage 26 communicates, via a line 36, the valve 33, a restrictor 37 and a passage 38 with the ignitor burners of the engine 10.

In the shut down condition of valve 33 the chamber 27 is connected, as previously described, to low pressure fuel flow to the ignitors is shut off and the outlet passage 26 communicates with a damp connection 39. A solenoid valve 40 is operable at engine start up to by-pass the restrictor 37 and to supply the proper quantity of ignition fuel to the engine 10.

As shown in FIG. 3 a governor arrangement 50 is driven at the speed N of the engine 10 and includes a valve spool 51 slidable within a ported stem 52 which forms part of a piston 53. The spool 51 and stem 52 co-operate to define a valve which is in series with a line 54 between the outlet of the pump 11 and a low pressure chamber 55. One side of the piston 53 is subjected to the pressure in line 54 and the other side of the piston 53 is subjected to a pressure intermediate the pressure in line 54 and the pressure in the chamber 55. The valve spool 51 and piston 53 thus provide a follow-up servo arrangement, to position the piston 53 in accordance with the speed N of the engine 10.

Surrounding the stem 52 of the piston 53 is a collar 56 which co-operates with a passage 57 within the stem 52 to define a control valve 58 for a servo piston 59. Valve 58 is in series with a resistor 60 between the line 54 and the low pressure chamber 55.

The collar 56 is positioned in accordance with a desired speed of the engine, by means of a link 61 one end of which pivotally engages a crank 62 which is mounted on a fixed pivot 63. The other end of the link 61 engages an arm 64 by means of a pivot pin 73. One end of the arm 64 moves with the piston 59 and the other end 74 of the arm 64 is in the form of a cam which is engaged in a fork in the collar 56. The cam end 74 of arm 64 is such that clockwise movement of arm 64 about the pin 73 urges the collar 56 to the right and anticlockwise movement of arm 64 urges the collar 56 to the left.

A cam follower 65 is movable about the fixed pivot 63 by means of a pilots control lever 66. The cam follower 65 is biased into engagement with a cam surface 67 by a spring 68, and movement of the cam follower 65 are transmitted to the collar 56 by a further link 69, the crank 62 and the link 61. The stem 52 is positioned in accordance with engine speed N and the collar 56 is positioned, inter alia in accordance with desired engine speed. The arm 64 provides a feedback link which is responsive to movement of the piston 59 to move the collar 59 in a direction which varies the servo pressure in passage 57 in a sense to oppose movement of the piston 59. The piston 59 is thus positioned in accordance with the difference between desired and actual engine speed. The position of the cam surface 67 relative to the pivot 63 is adjustable by an electric motor 70 which can slide the cam surface 67 on adjustable supports 71, 72. A lever 80 is movable by the piston 59 about a fixed pivot 81. Movement of the piston 59 is transmitted to lever 80 by spring-biased bushes 82. Movement of the lever 80 in response to differences between the desired and actual engine speeds is limited by bell cranks 83, 84 which are biased into engagement with respective cam profiles on the stem 52 by a spring 85. The bushes 82 allow for over travel of the piston 59 after engagement of the lever 80 with either of the cranks 83, 84. The crank 83 acts as an acceleration stop and the crank 84 acts as a deceleration stop.

Referring back to FIG. 2 the lever 80 coacts with an arm 86 at the free end of which is a roller 87. The roller 87 is engaged between a lever 90 and a further lever 91 which provides a control element for the pilot valve 19. A spring 92 is engaged between the lever 90 and the control valve 16 to provide a position feedback signal from the valve 16. The lever 91 extends sealingly into a chamber 93 and is acted upon by two bellows units 94, 95. Bellows unit 94 is evacuated and bellows unit 95 is responsive to a pressure P3 P derived from the delivery pressure P3 of the engine compressor. Chamber 93 contains a pressure P2 from an intermediate stage of the engine compressor. The lever control element 91 of the pilot valve 19 is thus positioned in accordance with engine compressor pressures P3 and P2 and the position feedback signal provided by the spring 92 is modified in accordance with the difference between actual engine speed N and the desired engine speed, by the roller 87.

Returning to FIG. 3, the servo pressure in the line 24 for positioning the spill valve 21, is as indicated above, controlled by the valve 23. Valve 23 is a spool valve which is connected between the line 54 and a low pressure chamber 95. The spool of valve 23 is positioned by a governor arrangement 96 which is driven by the governor arrangement 50. An increase in the engine speed N causes the spool of valve 23 to move in a direction to increase the pressure in line 24, and thereby to decrease spill flow. The governor arrangement 96 abuts a piston 97 which is responsive to the pressure in a line 98, an increase in the pressure in line 98 also acting to increase the pressure in line 94.

Line 98 communicates with the outlet of the metering valve 16 via a restrictor 100, and also with the outlet passage 26 via a port 101 which can be closed off by a part 102 of the throttle valve 25 when the latter is in its fully open position. Thus with the throttle valve wide open and the port 101 shut the pressure in line 98 is that at the outlet of the metering valve 16. In this condition the pressure in the line 24, is for a given engine speed N, dependent on the pressure at the outlet of the metering valve 16, and the spill valve 21 is thus positioned in accordance with the pressure drop across the metering valve 16. In all other conditions of the throttle valve 25 the port 101 is at least partly open, whereby the pressure in line 98 is dependent on the pressure in the outlet passage 26. In these circumstances the spill valve 21 is responsive to the pressure drop across the series arrangement of the metering valve 16 and the throttle valve 25.

The throttle valve 25 is dimensioned so that, in its wide open condition, it imposes very little restriction in fuel flow to the engine, this flow being regulated almost entirely by the metering valve 16. Control valve 30 is opened by the torque motor 31 to reduce pressure in chamber 27 and thereby to move the throttle valve in a shutting direction, only in response to an unacceptable rise in either engine speed or combustion chamber temperature. In normal operation, therefore, the spill valve 21 remains responsive to the pressure drop across the metering valve 16 only. If the throttle valve 25 moves in a closing direction the resultant decrease in pressure in the line 98 moves the spool of valve 23 to the right, reducing the pressure in line 24 to permit increased spill flow.

I claim:

1. A fuel control system for a gas turbine engine, comprising a variable metering device, a throttle valve, a flow passage connecting said metering device and said throttle valve in a series arrangement between an inlet zone and an outlet zone, means for varying the fuel pressure at said inlet zone, said pressure varying means being responsive to a difference between the fuel pressure at one of said zones and to a further fuel pressure, and selector valve means, operable by said throttle valve, for deriving said further pressure from that in said connecting flow passage when said throttle valve is fully open, and from the pressure at the other of said zones in all other states of said throttle valve, whereby said pressure varying means is responsive to the pressure difference across said metering device when the throttle valve is fully opened and to the pressure difference across said series arrangement in all other states of said throttle valve.

2. A system as claimed in claim 1 in which said pressure varying means comprises a spill valve for spilling fuel from said inlet zone.

3. A system as claimed in claim 1 which includes a further passage between said connecting flow passage and said other zone, and a flow restrictor in said further passage, said selector valve means being operable to prevent flow through said further passage, said further pressure being that within said further passage between said restrictor and said other zone.

4. A system as claimed in claim 3 in which said one zone is said downstream zone.

5. A system as claimed in claim 1 in which said selector valve means comprises part of said throttle valve.

6. A system as claimed in claim 1 which includes a pilot valve responsive to said further pressure and to the pressure at said inlet zone, for generating a servo pressure signal, said fuel pressure varying means being responsive to said servo pressure signal.

7. A system as claimed in claim 6 in which said pilot valve is responsive to engine speed.

* * * * *